US012799986B2

(12) United States Patent
Zipagan et al.

(10) Patent No.: US 12,799,986 B2
(45) Date of Patent: Nov. 17, 2026

(54) TAPERED SHAFT HUB ADAPTER

(71) Applicant: Cummins Inc., Columbus, IN (US)

(72) Inventors: Jean Esther C. Zipagan, Indianapolis, IN (US); Brian C. Dvorak, DePere, WI (US); Jacques L. Vincent, Warwickshire (GB); Kieran J. Richards, Northhamptonshire (GB); Deepak Pillai, Columbus, IN (US); Robert M. Quarles, Seymour, IN (US)

(73) Assignee: Cummins Inc., Columbus, IN (US)

( * ) Notice: Subject to any disclaimer, the term of this patent is extended or adjusted under 35 U.S.C. 154(b) by 549 days.

(21) Appl. No.: 18/268,175

(22) PCT Filed: Dec. 21, 2021

(86) PCT No.: PCT/US2021/064577
§ 371 (c)(1),
(2) Date: Jun. 16, 2023

(87) PCT Pub. No.: WO2022/140363
PCT Pub. Date: Jun. 30, 2022

(65) Prior Publication Data
US 2024/0052891 A1 Feb. 15, 2024

Related U.S. Application Data

(60) Provisional application No. 63/128,234, filed on Dec. 21, 2020.

(51) Int. Cl.
*F16D 1/092* (2006.01)

(52) U.S. Cl.
CPC .................................... *F16D 1/092* (2013.01)

(58) Field of Classification Search
CPC ....... F16D 1/092; F16D 1/0876; B60B 27/00; F04D 29/266; Y10T 29/49826; B63H 23/34
See application file for complete search history.

(56) References Cited

U.S. PATENT DOCUMENTS

| | | | |
|---|---|---|---|
| 1,790,737 | A | 2/1931 | Alborn |
| 2,543,854 | A | 3/1951 | Killingsworth |

(Continued)

FOREIGN PATENT DOCUMENTS

| | | | |
|---|---|---|---|
| CN | 2723688 | Y | 9/2005 |
| CN | 205401482 | U | 7/2016 |

(Continued)

OTHER PUBLICATIONS

International Search Report and Written Opinion for International patent application No. PCT/US2021/064577, filed Dec. 21, 2021, mailed Feb. 24, 2022.

(Continued)

*Primary Examiner* — Jason L Vaughan
*Assistant Examiner* — Amanda Kreiling
(74) *Attorney, Agent, or Firm* — Foley & Lardner LLP

(57) ABSTRACT

Disclosed embodiments include a pump assembly comprising a pump including a rotating drive shaft having a tapered end portion, a first alignment structure on the drive shaft, and a hub adapter including a first mounting portion comprising a tapered opening and a second mounting portion extending from the first mounting portion and configured to receive a drive member. The tapered opening is configured to be inserted onto and engaged with the tapered end portion of the drive shaft. A second alignment structure is located on the hub adapter, and the first alignment structure and the second alignment structure cooperate to enable a predetermined registration of the hub adapter on the drive shaft. A fastener structure secures the hub adapter to the drive shaft.

24 Claims, 8 Drawing Sheets

(56) References Cited

U.S. PATENT DOCUMENTS

| | | | | | |
|---|---|---|---|---|---|
| 3,061,342 | A | * | 10/1962 | Feller | F16D 1/092 416/204 R |
| 4,123,835 | A | | 11/1978 | Itoh | |
| 4,285,305 | A | | 8/1981 | Kaufman et al. | |
| 4,322,174 | A | | 3/1982 | Ishii | |
| 4,337,747 | A | | 7/1982 | Jefferson et al. | |
| 4,497,303 | A | | 2/1985 | Murayama et al. | |
| 4,572,144 | A | | 2/1986 | Handa | |
| 4,572,698 | A | * | 2/1986 | Rauch | F16D 1/0876 403/318 |
| 4,583,890 | A | | 4/1986 | Ewing | |
| 4,767,230 | A | | 8/1988 | Leas | |
| 4,925,249 | A | | 5/1990 | Auspelmyer | |
| 5,174,169 | A | | 12/1992 | Cheatham | |
| 5,400,885 | A | | 3/1995 | Phillips | |
| 6,599,052 | B1 | | 7/2003 | Phillips et al. | |
| 6,869,151 | B2 | | 3/2005 | Myers et al. | |
| 7,866,894 | B2 | | 1/2011 | Hewitt | |
| 9,631,697 | B2 | | 4/2017 | Sotani et al. | |
| 2008/0075402 | A1 | | 3/2008 | Hewitt | |
| 2009/0311041 | A1 | | 12/2009 | Sockman et al. | |
| 2017/0167454 | A1 | | 6/2017 | Bandy et al. | |

FOREIGN PATENT DOCUMENTS

| | | | |
|---|---|---|---|
| DE | 1918016 | A1 | 11/1969 |
| EP | 0851113 | A1 | 7/1998 |
| JP | 09-013993 | A | 1/1997 |
| WO | WO-2018/129613 | A1 | 7/2018 |

OTHER PUBLICATIONS

International Preliminary Report on Patentability received for PCT Patent Application No. PCT/US2021/064577, mailed on Jun. 29, 2023, 7 pages.

Office Action in CN Application No. 202180085353.4 dated Aug. 25, 2026, 20 pgs. (with translation).

* cited by examiner

TAPERED SHAFT HUB ADAPTER

CROSS-REFERENCE TO RELATED APPLICATIONS

This application claims priority to and is a U.S. national stage application of International Patent Application No. PCT/US2021/064577, filed Dec. 21, 2021, which claims priority to U.S. Provisional No. 63/128,234, filed on Dec. 21, 2020, the entire disclosures of which being expressly incorporated herein by their reference.

TECHNICAL FIELD

This disclosure relates generally to mechanical assemblies including a rotating tapered shaft and structures mounted to the tapered shaft. Embodiments include a hub adapter to couple a gear to a tapered drive shaft of a pump.

BACKGROUND

Mechanical assemblies including tapered shafts and structures mounted to the tapered shafts are generally known and disclosed, for example, by the Alborn U.S. Pat. No. 1,790,737 and the Killingsworth U.S. Pat. No. 2,543,854. These patents disclose axles having tapered end portions, and wheels having hubs. The wheels are mounted to the axles with the hubs inserted onto the tapered end portions of the axles. Nuts engaging threaded ends of the axles secure the hubs to the axles.

High pressure fuel pump assemblies including tapered shafts and drive gears mounted to the tapered shafts are also known. In these assemblies the end portions of the fuel pump drive shafts are tapered and include threaded stubs at their ends. Hubs of the gears have tapered central openings that are inserted onto the tapered end portions of the shafts. Nuts inserted onto the threaded stubs of the drive shafts secure the gears onto the drive shafts. Openings through the gear hubs that are aligned with openings in the drive shafts can receive pins to prevent the gear hubs from rotating on the drive shafts as the nuts are installed.

There remains, however, a continuing need for assemblies including rotating tapered shafts and structures mounted to the shafts. Such assemblies that are efficient to manufacture, assemble and/or service would be especially desirable.

SUMMARY

Disclosed embodiments include assemblies comprising rotating tapered shafts and structures mounted to the shafts. The assemblies are efficient to manufacture, assemble and/or service.

One example is an assembly comprising a rotating shaft having a tapered end portion; a hub adapter including a first mounting portion comprising a tapered opening and a second mounting portion extending from the first mounting portion and configured to receive a drive member, wherein the tapered opening is configured to be inserted onto and engaged with the tapered end portion of the rotating shaft; and an adapter fastener structure to secure the hub adapter to the rotating shaft.

In embodiments, the fastener structure comprises a threaded stub on the tapered end portion of the rotating shaft, wherein the threaded stub extends through the opening of the hub adapter; and a threaded nut installed on the threaded stud.

Embodiments further include a first adapter alignment structure on the hub adapter; and a second adapter alignment structure on the rotating shaft, wherein the first adapter alignment structure and the second adapter alignment structure cooperate to enable a predetermined registration of the hub adapter on the rotating shaft. The first adapter alignment structure may include a keyway; and the second adapter alignment structure may include a pin receivable by the keyway. In embodiments, the first adapter alignment structure includes a first alignment opening extending through a portion of the hub adapter and into the tapered opening; the second adapter alignment structure includes a second alignment opening extending into the tapered end portion of the rotating shaft, wherein the first and second adapter alignment openings can be aligned; and the assembly further includes a pin extending between the first alignment opening and the second alignment opening.

In embodiments, the first mounting portion of the hub adapter further includes a flange extending into the tapered opening and configured to engage the tapered end portion of the rotating shaft. The tapered end portion of the rotating shaft may include a shoulder; and the flange of the hub adapter may engage the shoulder of the rotating shaft.

Embodiments may further comprise a drive structure (e.g., a drive or driven member) mounted to the second mounting portion of the hub adapter. The drive structure may comprise a gear. Embodiments further comprise one or more drive fastener structures to secure the drive structure to the second mounting portion of the hub adapter. The one or more drive fastener structures may comprise a threaded opening in the second mounting portion of the hub adapter; and a threaded bolt inserted in the threaded opening. In embodiments, the drive structure includes an opening aligned with each threaded opening in the second mounting portion; and each threaded bolt extends through an associated opening in the drive member and into engagement with the drive member. Embodiments may also include a plurality of the drive member fastener structures at circumferentially spaced-apart locations on the second mounting portion around the tapered opening. Embodiments may further include a first location opening extending through the drive structure; a second location opening extending into the second mounting portion of the hub adapter, wherein the first and second location openings can be aligned; and a locating pin extending between the first location opening and the second location opening.

Embodiments of the assembly include a high pressure pump such as a fuel pump and the rotating shaft is a high pressure pump drive shaft. The drive structure may comprise a gear.

Another example is a pump assembly, comprising a pump including a rotating drive shaft having a tapered end portion; a first alignment structure on the drive shaft; a hub adapter including a first mounting portion comprising a tapered opening and a second mounting portion extending from the first mounting portion and configured to receive a drive member, wherein the tapered opening is configured to be inserted onto and engaged with the tapered end portion of the rotating shaft; a second alignment structure on the hub adapter, wherein the first alignment structure and the second alignment structure cooperate to enable a predetermined registration of the hub adapter on the rotating shaft; and a fastener structure to secure the hub adapter to the rotating shaft.

In embodiments, the first alignment structure includes a pin; and the second alignment structure includes a keyway receivable by the pin. Embodiments may further include a registration structure on the hub adapter to enable a predetermined registration of a drive member to the hub adapter. A drive member may be mounted to the hub adapter, and may comprise a gear.

Embodiments of the assembly further include a gear registration structure on one or both of the hub adapter and the gear to enable a predetermined registration of the gear to the hub adapter. The gear registration structure may include asymmetrically located fastener-receiving openings on one or both of the gear and the hub adapter.

Embodiments of the pump assembly are configured for mounting to an engine block; and the hub adapter further comprises alignment indicia for enabling alignment of the hub adapter to the engine block. Embodiments may include alignment indicia on the gear for enabling alignment of the gear.

DETAILED DESCRIPTION

Figure 1:
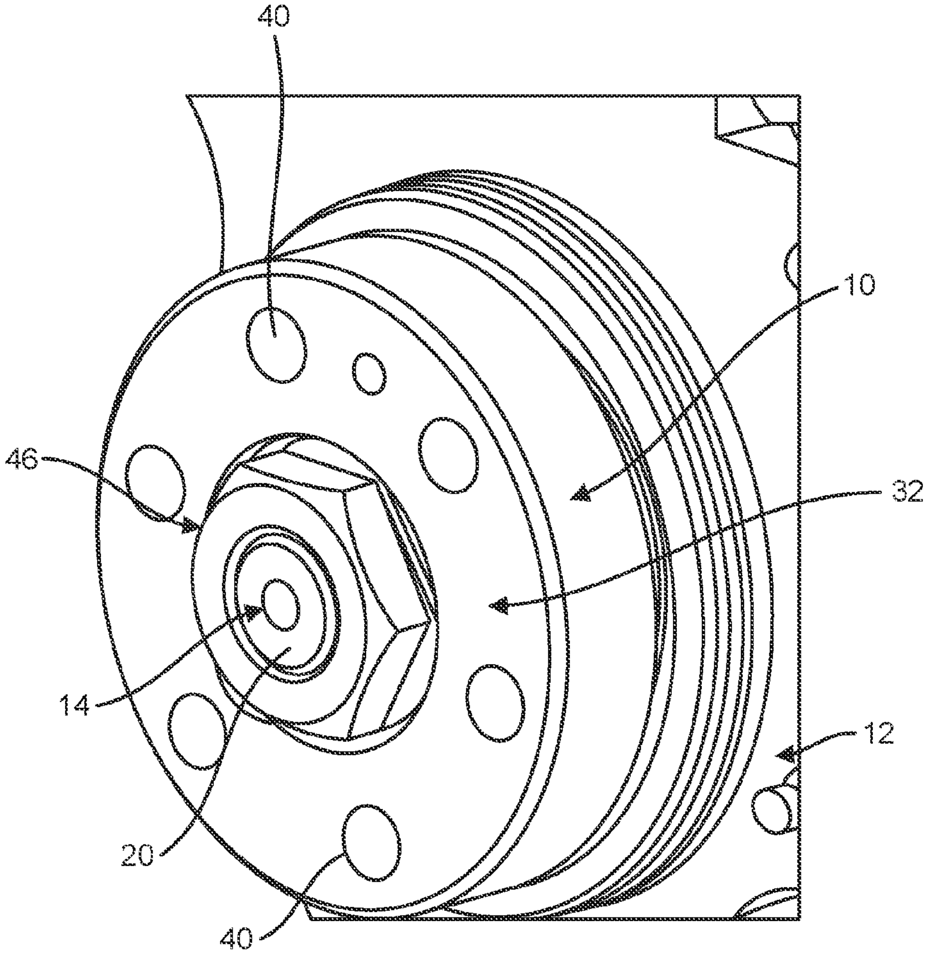
FIG. 1 is an isometric illustration of a pump, and a hub adapter mounted to a tapered drive shaft of the pump, in accordance with embodiments of a first example.
Figure 2:
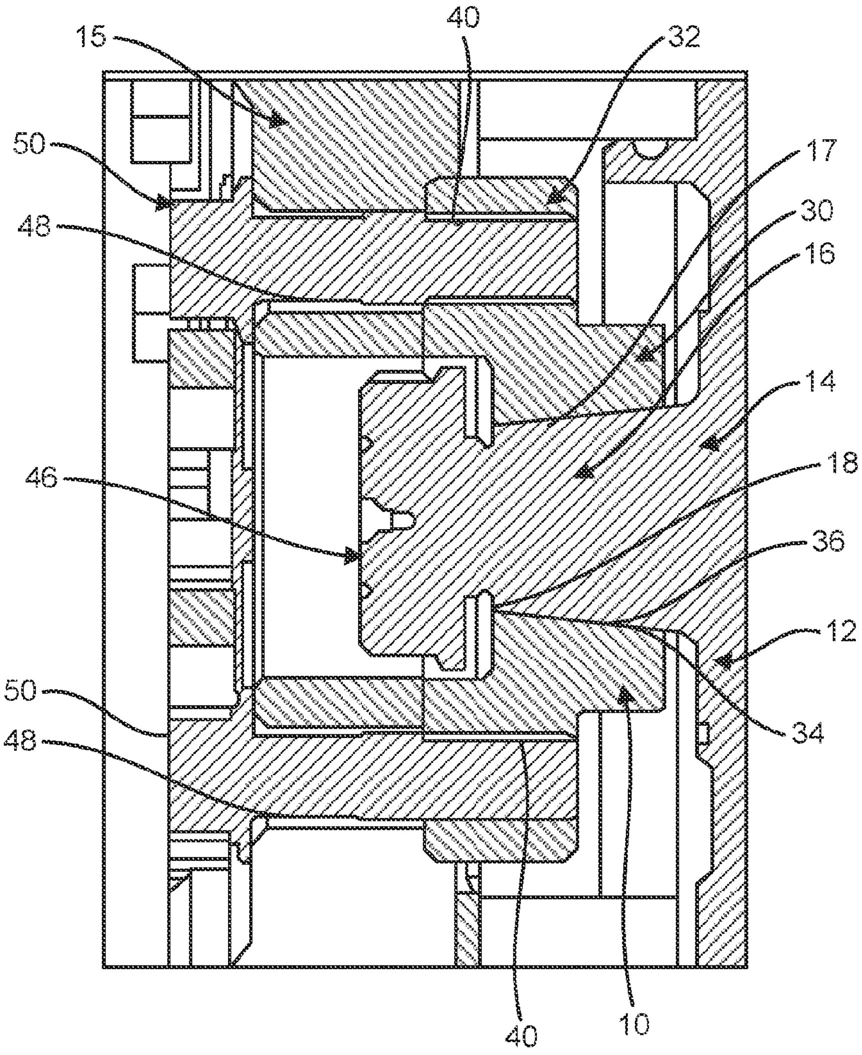
FIG. 2 is a cross sectional illustration of the tapered drive shaft and hub adapter shown in FIG. 1, showing a drive gear mounted to the hub adapter, in accordance with embodiments.

FIG. 1 and FIG. 2 illustrate a tapered shaft hub adapter 10 in accordance with embodiments of a first example incorporated into an application or assembly including a high pressure pump 12 having a tapered drive shaft 14. FIG. 1 is an isometric illustration of the high pressure pump 12, showing the hub adapter 10 mounted to the tapered drive shaft 14 of the pump. FIG. 2 is a cross sectional illustration of the tapered drive shaft 14 and hub adapter 12, showing a drive gear 15 mounted to the hub adapter in accordance with embodiments. In embodiments, the high pressure pump 12 is a fuel pump. Other embodiments include tapered shaft hub adapters such as 10 incorporated into other applications or assemblies, such as for example assemblies including alternators and vehicle axles. Other embodiments may include other drive or driven structures (e.g., other than drive gears such as 15) mounted to the hub adapters, such as for example pulleys or wheels.

As perhaps best shown in FIG. 2, drive shaft 14 includes a tapered end portion 16 defining an outer surface 17. The end portion 16 tapers in a direction of reduced diameter with increasing distance toward the end of the drive shaft. The tapered end portion 16 of the drive shaft 14 defines a shoulder 18. In the illustrated embodiments the shoulder 18 is located at an end of the tapered end portion 16. Embodiments of tapered drive shaft 14 include a threaded stub 20. In the illustrated embodiments the threaded stub 20 extends from tapered end portion 16 of the drive shaft 14 (e.g., beyond the shoulder 18). As described in greater detail below, the threaded stub 20 forms part of a fastener structure used to secure the drive shaft 14 to the hub adapter 10 in embodiments. Drive shaft 14 may be mounted for rotation on the high pressure pump 12 in a conventional manner.

Tapered hub adapter 10 includes a first or shaft mounting portion 30 and a second or drive mounting portion 32 that is peripheral to the shaft mounting portion. The shaft mounting portion 30 includes a tapered surface 34 defining a tapered opening 36. The tapered opening 36 tapers in a manner that is complimentary to the taper of the tapered end portion 16 of the drive shaft 14. The tapered surface 34 of the hub adapter 10 is thereby configured to mate with and engage the tapered end portion 16 of the drive shaft 14.

Drive mounting portion 32 includes portions extending circumferentially around the shaft mounting portion 30. In the illustrated embodiments the drive mounting portion 32 is continuous. Drive mounting portion 32 is configured to receive the drive gear 15 (or other drive or driven structures in other embodiments). In the illustrated embodiments the drive mounting portion 32 includes a plurality of threaded openings 40 at circumferentially spaced-apart locations. As described in greater detail below, the threaded openings 40 form part of a fastener structure used to join the hub adapter 10 to the drive gear 15 in embodiments. Embodiments of the hub adapter 10 include a location opening 42 extending into the drive mounting portion 32 on a side opposite the side facing the high pressure pump 12. As described in greater detail below, the location opening 42 may be used to join the hub adapter 12 and drive gear 15.

Tapered hub adapter 10 is assembled onto the high pressure pump 12 by sliding the shaft mounting portion 32 over the drive shaft 14 (i.e., with the tapered end portion 16 of the drive shaft extending into the tapered opening 36 of the hub adapter). The tapered surface 34 of the hub adapter 10 thereby engages the surface 17 of the tapered end portion 16 of the drive shaft 14 for a friction fit. With the hub adapter 10 mounted on the drive shaft 14, the threaded stub 20 of the drive shaft will extend through the tapered opening 36 of the mounting portion 30. A threaded nut 46 can be inserted onto the threaded stub 20 to secure the hub adapter 10 to the drive shaft 14. In other embodiments, other fastener structures are used to secure the hub adapter 10 to the drive shaft 14 (e.g., a bolt screwed into a threaded opening in the drive shaft 14).

Drive gear 15 can be assembled onto the drive mounting portion 32 of the hub adapter 10. Embodiments of the drive gear 15 may include a location opening (not shown) that extends through the gear (i.e., in a direction generally perpendicular to the rotational axis of the gear). The location opening is positioned on the drive gear 15 to align with the location opening 42 in the hub adapter 10 when the drive gear is properly located on the hub adapter. In embodiments that include the location opening in the drive gear 15 and location opening 42 in the hub adapter 10, the location openings may be aligned, and a dowel pin (not shown) inserted into or through the location openings with portions of the pin extending into both the gear and hub adapter to locate the gear and hub adapter with respect to one another. Drive gear 15 includes openings 48 that extend through the gear and are aligned with the threaded openings 40 in the hub adapter 10. Threaded bolts 50 are inserted though the openings 48 and into corresponding threaded openings 40 in the hub adapter 10 to secure the drive gear 15 to the hub adapter. In other embodiments, other fastener structures are used to secure the drive gear 15 to the hub adapter 10 (e.g., treaded studs extending from the hub adapter through holes in the drive gear, with threaded nuts on the studs).

Hub adapters such as 10 may provide important advantages. For example, they can couple torque between a drive or driven source and a drive shaft (e.g., from a gear train to a high pressure pump in the illustrated embodiments). Flat drive members such as the drive gear can be effectively coupled to tapered shafts. Serviceability of the drive source-to-drive shaft joint is enhanced as the bolts or other fasteners that secure the gear or other drive structure to the hub adapter may have lower nominal torque than a single nut (e.g., if the drive gear is mounted directly to the drive shaft). It allows the drive gear or other drive member to be removed and serviced without servicing the tapered drive shaft joint. It may also prevent field related issues to slip issues from servicing the taper joint by making the taper a non-service item installed during the driven member (e.g., high pressure pump) assembly.

Figure 3:
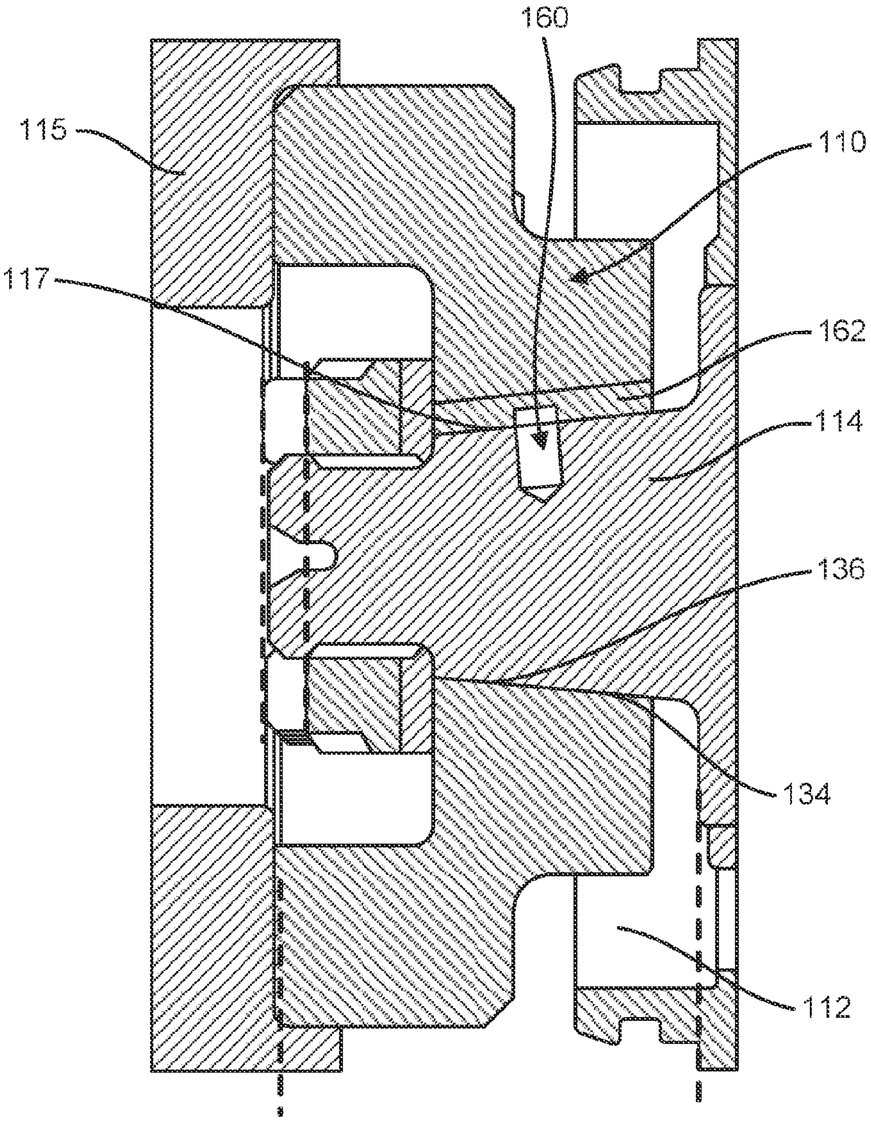
FIG. 3 is a cross sectional illustration of a pump, and a hub adapter mounted to a tapered drive shaft of the pump, and showing a drive gear mounted to the hub adapter, in accordance with embodiments of a second example.
Figure 4:
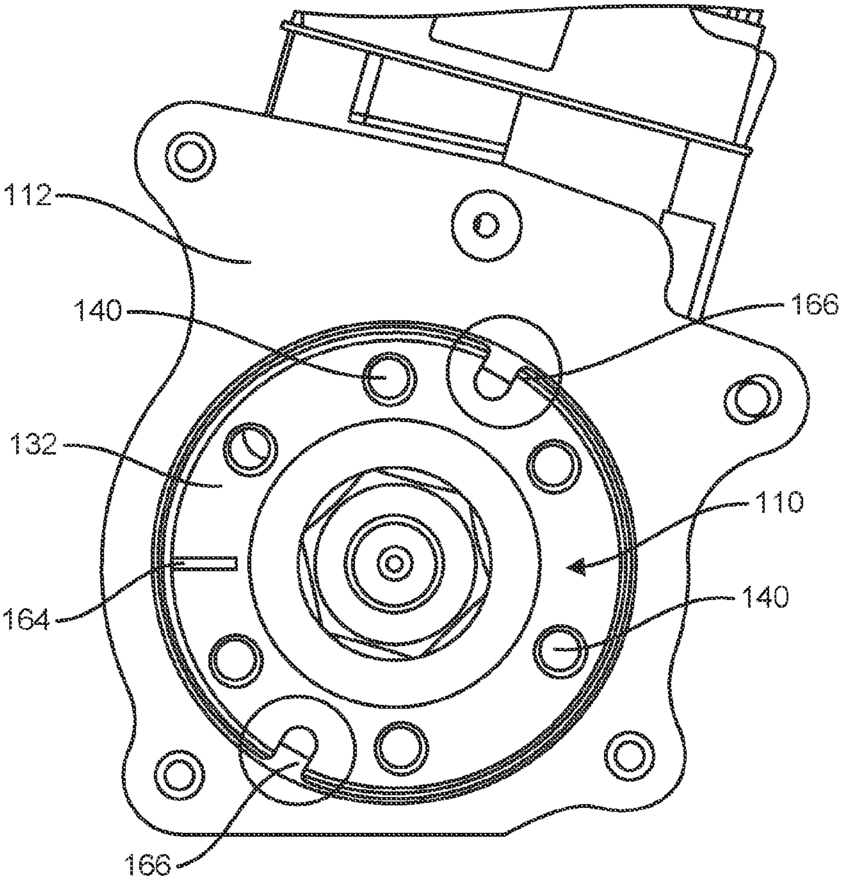
FIG. 4 is a plan view of the pump and hub adapter shown in FIG. 3, in accordance with embodiments.

FIG. 3 and FIG. 4 illustrate a tapered shaft hub adapter 110 in accordance with embodiments of a second example incorporated into an application or assembly including a high pressure fuel pump 112 having a tapered drive shaft 114. A portion of a drive gear 115 is shown mounted to the hub adapter 110. As described in greater detail below, hub adapter 110 includes indicia and structure that register and/or cooperate with other indicia and structures to enable the proper timing of the pump 112 with other structures of the engine block. With the exception of the features and/or differences described below, features of hub adapter 110, pump 112, tapered drive shaft 114 and drive gear 115 may be substantially the same as or similar to those of hub adapter 10, pump 12 drive shaft 14 and gear 15 described above in connection with FIGS. 1 and 2, and similar features are identified by similar reference numbers in the "lxx" series.

As shown in FIGS. 3 and 4, the tapered shaft 114 of the pump 112 includes a dowel pin 160 extending from the surface 117 of the shaft. Dowel pin 160 is located at a predetermined position about the outer circumference of the shaft 114 and functions as a registration indicia with respect to the operating stroke of the pump 112. Tapered shaft hub adapter 110 includes an elongated slot or keyway 162 in the surface 134 of the opening 136. The keyway 162 is sized to receive the dowel pin 160 when the hub adapter is slid or otherwise assembled onto the shaft 114 of the pump 112. The location of the keyway 162 is registered to other features on the hub adapter 110, such as the threaded openings 140 and alignment mark 164 on the end face of the drive mounting portion 132 of the hub adapter. Keyway 162 thereby functions as a registration indicia that cooperates with the dowel pin 160 to register the hub adapter 110 to a predetermined position about the rotational axis on the tapered shaft 114. Because of the registration provided by the dowel pin 160 and keyway 162, the locations of features of the hub adapter 110, such as the threaded openings 140 and alignment mark 164, are registered to the operating stroke of the pump 112.

Figure 5:
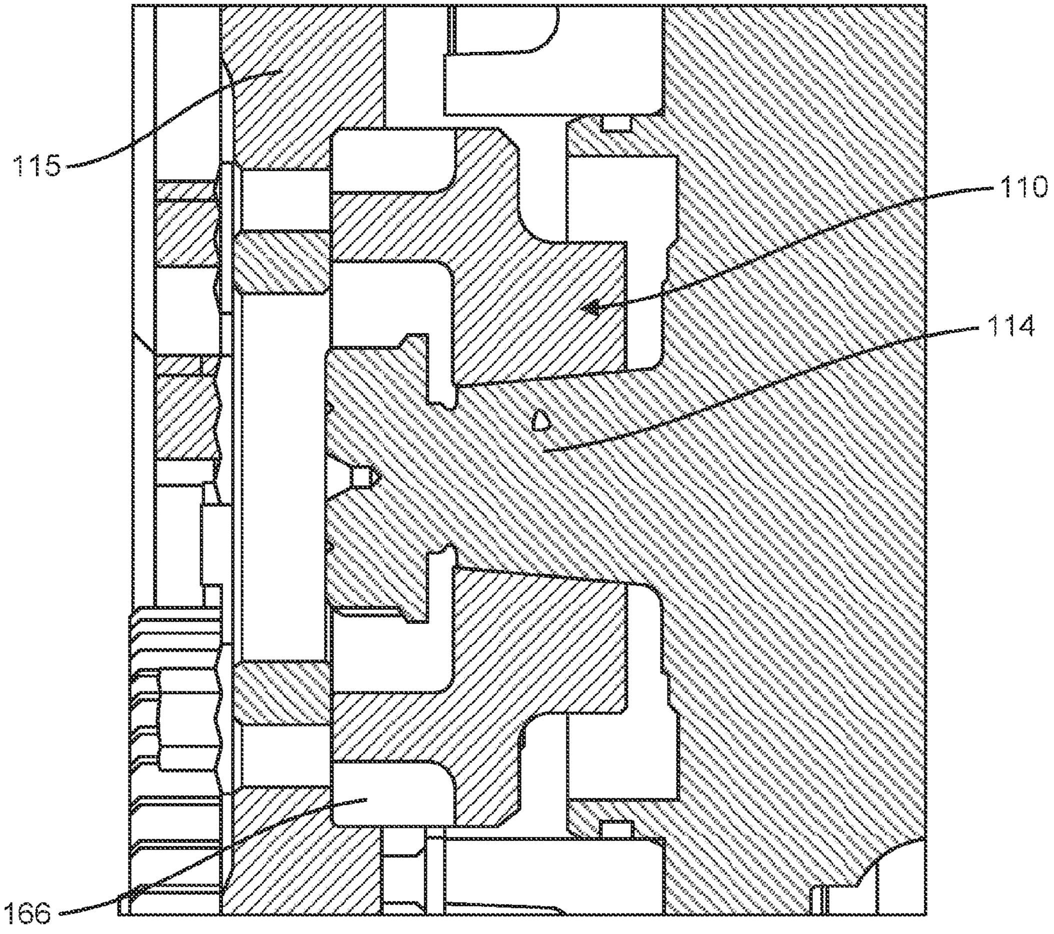
FIG. 5 is a detailed cross sectional illustration of the pump, hub adapter and gear shown in FIGS. 3 and 4, in accordance with embodiments.

The illustrated embodiments of tapered shaft hub adapter 110 also include one or more structures shown as openings or notches 166 (two are shown). The notches 166 function as structures on the hub adapter 110 that can be engaged by tooling (not shown) during the assembly or installation of the hub adapter onto the pump 112 to radially hold the hub adapter with respect to the pump and resist torque. In the illustrated embodiments the notches 166 are shown on the peripheral edge of the drive mounting portion 132 of the hub adapter 110. As shown in FIG. 5, the notches 166 are recesses in the outer peripheral edge of the hub adapter 110, and have a depth that is less than the full thickness of the hub adapter at the location of the notches. The notches 166 thereby extend into a partial depth of the hub adapter 110. By this structure and location, the notches 166 may minimize or block debris from possible failures of the fuel pump 112 from being transferred to the gear 115 or other adjacent components such as the gear train. Alternatively or in addition, other embodiments include other structures, and/or such structures at different locations on the hub adapter 110, to provide the functionality of the notches 166.

In embodiments, the hub adapter 110 and/or gear 115 are configured so that the gear can be installed or assembled onto the hub adapter in a matter that registers or times the position of the gear on the hub adapter (and thereby to the operating stroke of the pump 112). In the embodiments shown in FIGS. 6A and 6B, for example the threaded openings 140 in the hub adapter 110 are asymmetrically positioned about the hub adapter so that the gear 115 (not shown in FIGS. 6A and 6B), which includes openings 148 (FIG. 7) corresponding to the threaded openings in the hub adapter, can be installed on the hub adapter in only one position. In the embodiments shown in FIG. 6A, for example, one of the threaded openings 140 is circumferentially spaced from adjacent openings by 50° and 70°, while the other threaded openings are spaced from one another by 60°.

Figure 6A:
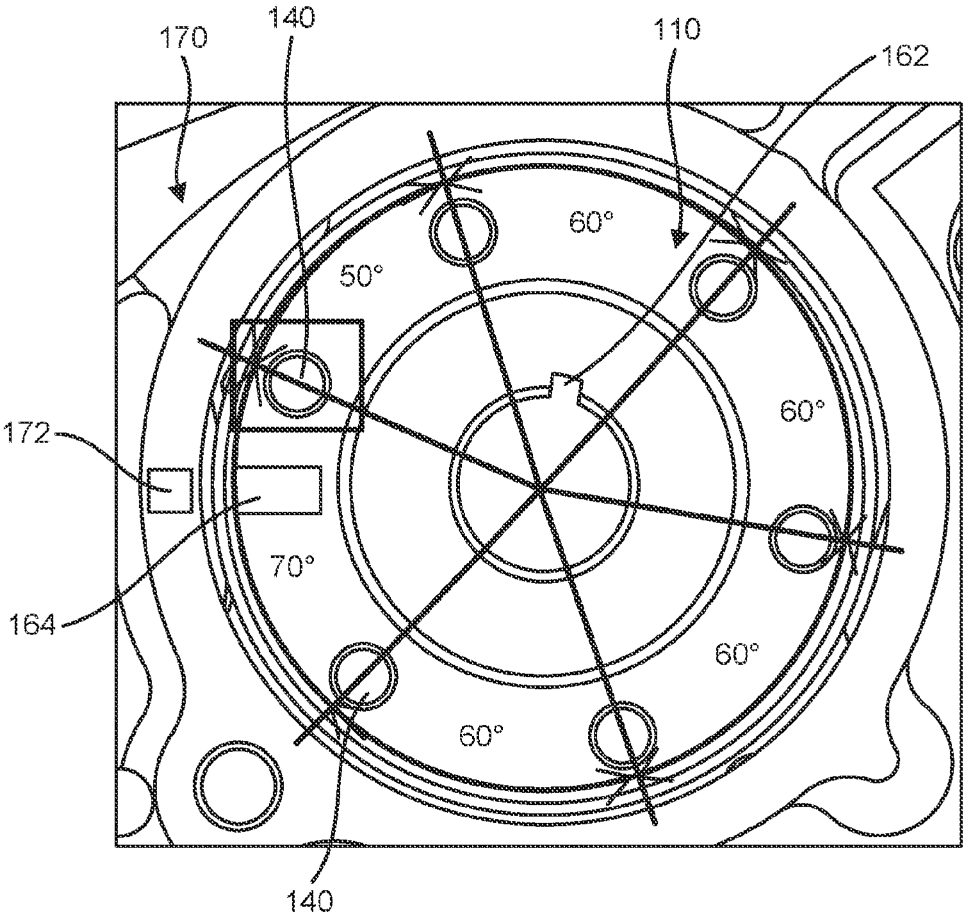
FIGS. 6A and 6B illustrate the hub adapter shown in FIG. 3 extending through an opening in an engine block when the pump (not visible in FIGS. 6A, 6B) is mounted to the engine block.
Figure 6B:
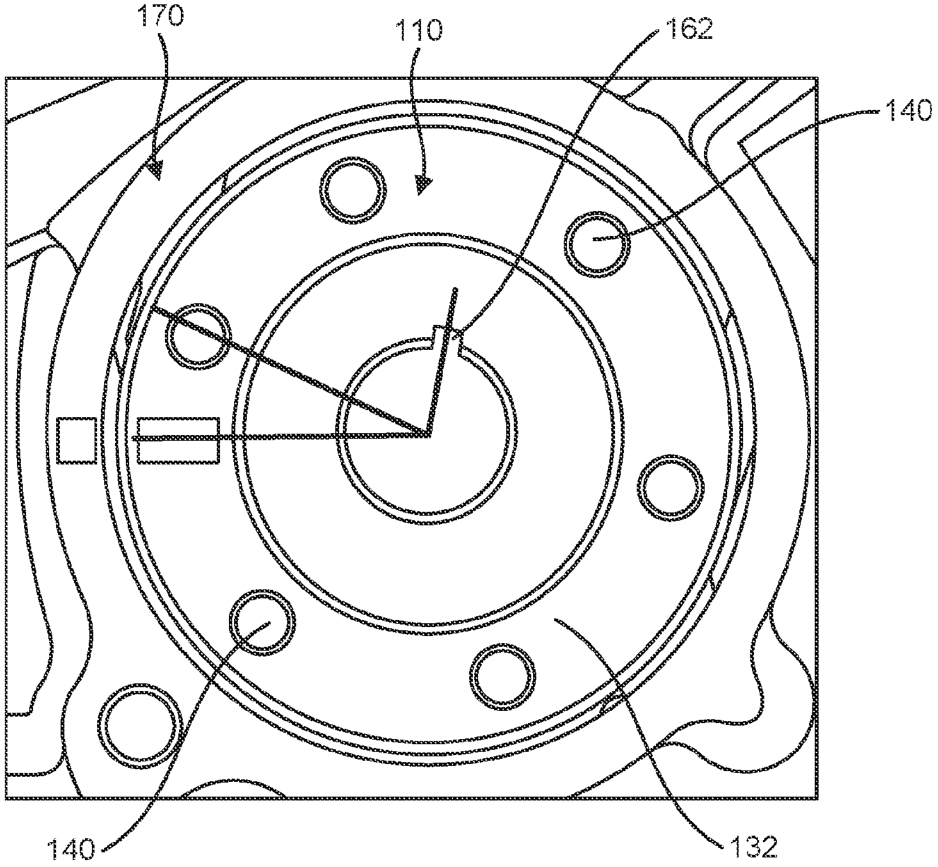
Figure 7:
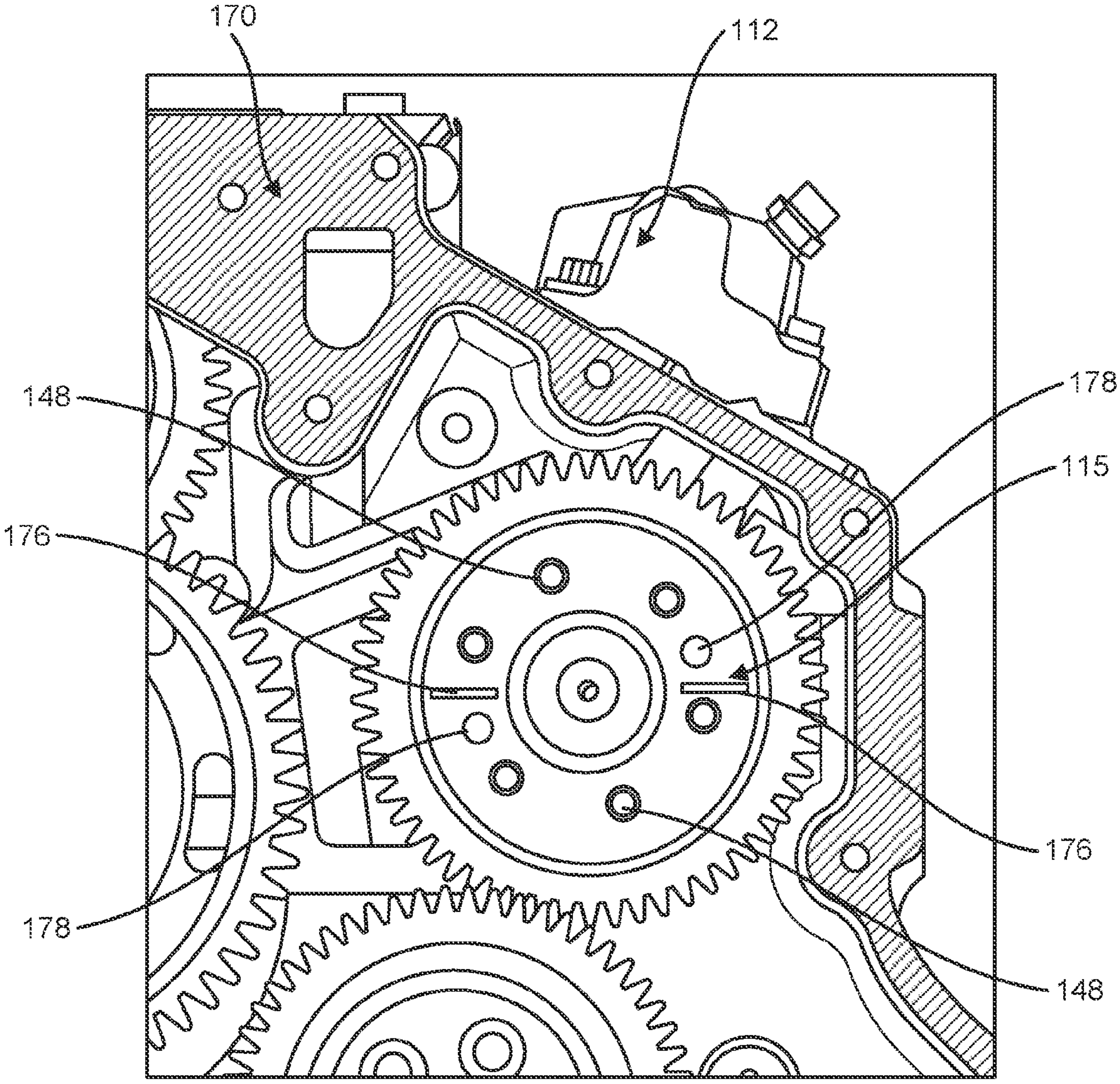
FIG. 7 is a detailed illustration of the pump and hub adapter shown in FIG. 4 mounted to an engine block, and showing a drive gear mounted to the hub adapter, in accordance with embodiments.

FIGS. 6A and 6B illustrate the hub adapter 110 extending though an opening in an engine block 170 after the pump 112 (not visible in FIGS. 6A, 6B) is mounted to the engine block. FIG. 7 is a view of the hub adapter 110/pump 112/engine block 170 assembly shown in FIGS. 6A and 6B, illustrating also the drive gear 115 mounted to the hub adapter (which is not generally visible in FIG. 7). As shown in FIG. 6B, the angle between the keyway 162 and the alignment mark 164 are controlled so that the alignment mark is horizontal when the tapered shaft 114 of the pump 112 is timed or registered at the proper angle. The embodiments shown in FIGS. 6A and 6B include an alignment mark 172 on the engine block 170 that can be located with respect to the alignment mark 164 on the hub adapter 110 to indicate proper registration or timing of the hub adapter. In the illustrated embodiments, the alignment mark 172 on the engine block 170 is located to identify the desired horizontal position of the alignment mark 164 on the hub adapter 110. Alignment marks 164 and 172 are etched onto the hub adapter 110 and engine block 170 in embodiments. In other embodiments other structures and/or other positional locations of the structures may be used to indicate the desired timing or registration between the hub adapter 110 and engine block 170.

The embodiments of drive gear 115 illustrated in FIG. 7 include a plurality of alignment marks 176, which may, for example, be marks etched onto the gear. Alignment marks 176 function as indicia to indicate the proper timing or registration of the pump 112. In the embodiments illustrated in FIG. 7, for example, the alignment marks 176 will be oriented horizontally when the pump 112 is properly timed. Other embodiments include other indica, and/or locations of such indica on the drive gear 115, to indicate that the fuel pump 112 is installed and timed properly. The embodiments of drive gear 115 shown in FIG. 7 also includes threaded holes 178 that are configured to removably receive threaded studs or bolts (not shown) that can be used as grips to aid with the assembly and/or removal of the drive gear with respect to the hub adapter 110.

Embodiments of hub adapter 110, pump 112 and gear 115 offer important advantages. For example, the hub adapter 110 may be installed on the pump 112 to form an assembly during a first manufacturing operation (e.g., by a first entity), and later assembled onto the engine block 170 during a second manufacturing operation (e.g., by a second entity). The assembly including the pump 112 and hub adapter 110 can thereby be efficiently assembled onto the engine block 170. Similarly, the drive gear 115 can be efficiently assembled onto the assembly of the pump 112 and hub adapter 110. The timing and registration indicia and features, such as the dowel pin 160 and keyway 162, asymmetrically arranged openings 140 on the hub adapter 110 and corresponding openings 148 on the drive gear 115, and alignment indicia 164, 172 and 176, enable the efficient and effective timing or registration of the pump 112 to the drive gear 115 and/or other drive train components during the assembly process.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in connection with another embodiment. The scope of the invention should, therefore, be determined with reference to the appended claims, along with the full scope of equivalents to which such claims are entitled.

What is claimed is:

1. An assembly, comprising:

a rotating shaft rotatable about a first axis and having a tapered end portion;

a hub adapter including a first mounting portion comprising a tapered opening and a second mounting portion extending from the first mounting portion and configured to couple with a drive member, wherein the tapered opening is configured to be inserted onto and engaged with the tapered end portion of the rotating shaft;

a plurality of fasteners adapted to couple the drive member to a mounting interface of the second mounting portion, the mounting interface positioned longitudinally offset from the first mounting portion along the first axis; and an adapter fastener structure to secure the hub adapter to the rotating shaft.

2. The assembly of claim 1 wherein the fastener structure comprises:

a threaded stub on the tapered end portion of the rotating shaft, wherein the threaded stub extends through the opening of the hub adapter; and a threaded nut installed on the threaded stud.

3. The assembly of claim 2 and further including:

a first adapter alignment structure on the hub adapter; and a second adapter alignment structure on the rotating shaft, wherein the first adapter alignment structure and the second adapter alignment structure cooperate to enable a predetermined registration of the hub adapter on the rotating shaft.

4. The assembly of claim 3 wherein:

the first adapter alignment structure includes a keyway; and the second adapter alignment structure includes a pin receivable by the keyway.

5. The assembly of claim 3 wherein:

the first adapter alignment structure includes a first alignment opening extending through a portion of the hub adapter and into the tapered opening;

the second adapter alignment structure includes a second alignment opening extending into the tapered end portion of the rotating shaft, wherein the first and second adapter alignment openings can be aligned; and the assembly further includes a pin extending between the first alignment opening and the second alignment opening.

6. The assembly of claim 1 wherein the first mounting portion of the hub adapter further includes a flange extending into the tapered opening and configured to engage the tapered end portion of the rotating shaft.

7. The assembly of claim 6 wherein:

the tapered end portion of the rotating shaft includes a shoulder; and the flange of the hub adapter engages the shoulder of the rotating shaft.

8. The assembly of claim 1 and further comprising a drive structure mounted to the second mounting portion of the hub adapter.

9. The assembly of claim 8 wherein the drive structure comprises a gear.

10. The assembly of claim 8 and further comprising one or more drive fastener structures to secure the drive structure to the second mounting portion of the hub adapter.

11. The assembly of claim 10 wherein the one or more drive fastener structures comprise:

a threaded opening in the second mounting portion of the hub adapter; and a threaded bolt inserted in the threaded opening.

12. The assembly of claim 11 wherein:

the drive structure includes an opening aligned with each threaded opening in the second mounting portion; and each threaded bolt extends through an associated opening in the drive member and into engagement with the drive member.

13. The assembly of claim 11 including a plurality of the drive member fastener structures at circumferentially spaced-apart locations on the second mounting portion around the tapered opening.

14. The assembly of claim 8 and further including:

a first location opening extending through the drive structure;

a second location opening extending into the second mounting portion of the hub adapter, wherein the first and second location openings can be aligned; and a locating pin extending between the first location opening and the second location opening.

15. The assembly of claim 8 wherein the drive structure comprises a gear.

16. The assembly of claim 1 wherein the assembly includes a high pressure pump such as a fuel pump and the rotating shaft is a high pressure pump drive shaft.

17. A pump assembly, comprising:

a pump including a rotating drive shaft having a tapered end portion;

a first alignment structure on the drive shaft;

a hub adapter including a first mounting portion comprising a tapered opening and a second mounting portion extending from the first mounting portion and configured to receive a drive member, wherein the tapered opening is configured to be inserted onto and engaged with the tapered end portion of the rotating shaft;

a second alignment structure on the hub adapter, wherein the first alignment structure and the second alignment structure cooperate to enable a predetermined registration of the hub adapter on the rotating shaft; and a fastener structure to secure the hub adapter to the rotating shaft.

18. The pump assembly of claim 17 wherein:

the first alignment structure includes a pin; and the second alignment structure includes a keyway receivable by the pin.

19. The pump assembly of claim 17 and further including a registration structure on the hub adapter to enable a predetermined registration of a drive member to the hub adapter.

20. The pump assembly of claim 17 and further including a drive member mounted to the hub adapter, and wherein the drive member comprises a gear.

21. The pump assembly of claim 20 and further includes a gear registration structure on one or both of the hub adapter and the gear to enable a predetermined registration of the gear to the hub adapter.

22. The pump assembly of claim 21, wherein the gear registration structure includes asymmetrically located fastener-receiving openings on one or both of the gear and the hub adapter.

23. The pump assembly of claim 20 and further including alignment indicia on the gear for enabling alignment of the gear.

24. The pump assembly of claim 17, wherein:

the pump assembly is configured for mounting to an engine block; and the hub adapter further comprises alignment indicia for enabling alignment of the hub adapter to the engine block.

* * * * *